(12) United States Patent
Yan et al.

(10) Patent No.: US 11,381,721 B2
(45) Date of Patent: Jul. 5, 2022

(54) MULTI-LENS CAMERA AND LENS ADJUSTING DEVICE THEREFOR

(71) Applicant: HANGZHOU HIKVISION DIGITAL TECHNOLOGY CO., LTD., Hangzhou (CN)

(72) Inventors: Caisheng Yan, Hangzhou (CN); Yan Wu, Hangzhou (CN); Zhan Ye, Hangzhou (CN); Peng Xu, Hangzhou (CN)

(73) Assignee: Hangzhou Hikvision Digital Technology Co., Ltd., Hangzhou (CN)

( * ) Notice: Subject to any disclaimer, the term of this patent is extended or adjusted under 35 U.S.C. 154(b) by 78 days.

(21) Appl. No.: 16/966,586

(22) PCT Filed: Nov. 30, 2018

(86) PCT No.: PCT/CN2018/118530
§ 371 (c)(1),
(2) Date: Jul. 31, 2020

(87) PCT Pub. No.: WO2019/192197
PCT Pub. Date: Oct. 10, 2019

(65) Prior Publication Data
US 2020/0366820 A1 Nov. 19, 2020

(30) Foreign Application Priority Data

Apr. 4, 2018 (CN) .......................... 201810304416.0
Apr. 4, 2018 (CN) .......................... 201820481642.1

(51) Int. Cl.
*H04N 5/225* (2006.01)
*F16M 11/12* (2006.01)
*G03B 17/12* (2021.01)

(52) U.S. Cl.
CPC ......... *H04N 5/2254* (2013.01); *F16M 11/123* (2013.01); *G03B 17/12* (2013.01); *H04N 5/2252* (2013.01); *H04N 5/225251* (2018.08)

(58) Field of Classification Search
CPC .............. H04N 5/2254; H04N 5/2252; H04N 5/225251; H04N 5/2258; H04N 5/2259;
(Continued)

(56) References Cited

U.S. PATENT DOCUMENTS

D823,919 S * 7/2018 Persson ......................... D16/203
D865,032 S * 10/2019 Katori ........................... D16/219
(Continued)

FOREIGN PATENT DOCUMENTS

CN 1971074 A 5/2007
CN 102333187 A 1/2012
(Continued)

OTHER PUBLICATIONS

Second Office Action issued in Chinese Application No. 201810304416. 0, dated Jul. 28, 2020.
(Continued)

*Primary Examiner* — Shahbaz Nazrul
(74) *Attorney, Agent, or Firm* — Meunier Carlin & Curfman LLC

(57) ABSTRACT

A lens adjusting device for a multi-lens camera, comprising: a first holder and a second holder, which is provided on the first holder and is configured for mounting a lens; wherein, the second holder is rotatably cooperated with the first holder and can rotate in a direction parallel to a support plane of the first holder; one of the support plane of the first holder and a surface on the second holder opposite to the support plane is provided with a plurality of first toothed slots, and the other is provided with a first engaging teeth, and the first engaging teeth is elastically engaged with the (Continued)

first toothed slots in the rotation direction of the second holder. The solution above can solve current issues that operation is complex and adjustment efficiency is low existed in adjustment of a lens in P direction by a multi-lens camera.

20 Claims, 5 Drawing Sheets

(58) Field of Classification Search
CPC .... H04N 5/2251; F16M 11/123; G03B 17/12; G03B 17/561; G03B 37/04
See application file for complete search history.

(56) References Cited

U.S. PATENT DOCUMENTS

| | | | |
|---|---|---|---|
| 11,184,514 B2* | 11/2021 | Hong | H04N 5/2251 |
| 2009/0154912 A1* | 6/2009 | Lin | G03B 17/00 |
| | | | 396/427 |
| 2013/0100292 A1 | 4/2013 | Mojaver | |
| 2013/0287385 A1* | 10/2013 | Andersson | H04N 5/2252 |
| | | | 396/427 |
| 2015/0358538 A1* | 12/2015 | Donaldson | G03B 17/55 |
| | | | 348/38 |
| 2015/0381858 A1* | 12/2015 | Sterngren | F16M 11/18 |
| | | | 348/143 |
| 2016/0191813 A1* | 6/2016 | Wu | H04N 5/2252 |
| | | | 348/159 |
| 2018/0165932 A1* | 6/2018 | Larsson | G03B 17/12 |
| 2019/0191059 A1* | 6/2019 | Park | G03B 17/561 |
| 2019/0327398 A1* | 10/2019 | Shin | G03B 37/04 |

FOREIGN PATENT DOCUMENTS

| | | |
|---|---|---|
| CN | 102333187 | 4/2013 |
| CN | 202992556 U | 6/2013 |
| CN | 204829153 U | 12/2015 |
| CN | 204942947 U | 1/2016 |
| CN | 1057159188 | 9/2017 |
| CN | 1105715918 B | 9/2017 |
| CN | 206559464 U | 10/2017 |
| CN | 107357115 | 11/2017 |
| CN | 207051633 | 2/2018 |
| CN | 207184634 U | 4/2018 |
| CN | 207573503 U | 7/2018 |
| CN | 207906750 U | 9/2018 |
| CN | 207939601 U | 10/2018 |
| CN | 208079235 U | 11/2018 |
| CN | 208079236 U | 11/2018 |
| CN | 208128384 U | 11/2018 |
| CN | 109973776 A | 7/2019 |
| CN | 109981994 A | 7/2019 |
| CN | 109981995 A | 7/2019 |
| CN | 109981996 A | 7/2019 |
| EP | 3168819 | 5/2017 |
| JP | 2015096903 A | 5/2015 |

OTHER PUBLICATIONS

Translation of International Search Report issued in corresponding application No. PCT/CN2018/118530, dated Feb. 19, 2019, 3 pages.
Supplementary Search of priority Chinese Application No. 201810304416.0 dated Oct. 26, 2020.
Extended Search Report issued in corresponding European Application No. 18913687.2 dated Jan. 22, 2021.
Zhiguo Yan, et al. (2017). Application of intelligent video surveillance. In Target detection and tracking technology of multi-camera cooperative attention (pp. 2-5). Southeast University Press.

* cited by examiner

MULTI-LENS CAMERA AND LENS ADJUSTING DEVICE THEREFOR

The present application claims the priority to a Chinese Patent Application 201810304416.0, filed with the China National Intellectual Property Administration on Apr. 4, 2018 and entitled "Multi-lens camera", which is incorporated herein by reference in their entirety. The present application claims the priority to a Chinese Patent Application 201820481642.1, filed with the China National Intellectual Property Administration on Apr. 4, 2018 and entitled "Multi-lens camera and lens adjusting device therefor", which is incorporated herein by reference in their entirety.

TECHNICAL FIELD

The present application relates to the technical field of camera designing, and in particular to a multi-lens camera and a lens adjusting device for the multi-lens camera.

BACKGROUND

A multi-lens camera is a typically used camera device, includes a plurality of lenses, which lenses are distributed in the circumferential direction of the multi-lens camera. A multi-lens camera is classified into a fixed multi-lens camera or an adjustable multi-lens camera depending on whether lenses are fixed or not. Each lens of an adjustable multi-lens camera can independently carry out three-axis adjustment, i.e., each lens can carry out angle adjustment in P direction, T direction, and R direction, so that adjustment of shooting angle of the lens can be implemented. Images shot by the plurality of lenses can be combined into a panoramic image for the multi-lens camera.

Usually, a lens is fixed on a mounting disk via a lens holder. During the adjustment in P direction, the lens holder can rotate in a plane parallel to the mounting disk, so that rotation of the lens in the plane parallel to the mounting disk can be implemented, i.e., the adjustment in P direction can be implemented. Having been adjusted in place, an operator can lock the lens holder relative to the mounting disk via a fastening screw, so that the lens is kept in a place after the adjustment. Of course, for next adjustment, an operator is required to unscrew the screw to enable the lens holder to bring the lens to rotate relative to the mounting disk. Obviously, the adjustment of a lens in P direction requires an operator to frequently unscrew and screw the screw, thus resulting in issues that operation is complex and adjustment efficiency is low.

SUMMARY

The object of the present application is to provide a multi-lens camera and a lens adjusting device for the multi-lens camera, so as to solve issues that operation is complex and adjustment efficiency is low.

To solve the issues above, the present application employs the following technical solution:

In a first aspect, the present application provides a lens adjusting device for the multi-lens camera, comprising:
a first holder 100; and
a second holder 200, which is provided on the first holder 100 and is configured for mounting a lens 400;
wherein, the second holder 200 is rotatably cooperated with the first holder 100;
the second holder 200 in an actuated state can rotate in a direction parallel to a support plane 110 of the first holder 100;
one of the support plane 110 of the first holder 100 and a surface of the second holder 200 opposite to the support plane is provided with a plurality of first toothed slots 210, and the other is provided with a first engaging teeth 120; and
the first engaging teeth 120 is elastically engaged with the first toothed slots 210 in the rotation direction of the second holder 200.

In a second aspect, the present application provides a multi-lens camera, comprising:
lenses; and
a lens adjusting device;
wherein, the lenses 400 are mounted on the lens adjusting device; and
the lens adjusting device is the lens adjusting device according to the first aspect.

The technical solution employed by the present application can achieve the following advantage.

In the lens adjusting device disclosed by the present application, the first holder and the second holder are elastically engaged through the first engaging tooth and the first toothed slots. In the adjustment of the lens in P direction, the operator is required to rotate only the second holder, without performing unscrewing and screwing operations described in background. This undoubtedly makes operating the adjustment of lens in P direction easy, that is, the operator is required to perform an operation of just one step. Obviously, the above structure of the lens adjusting device can improve the adjustment efficiency of the lens.

BRIEF DESCRIPTION OF THE DRAWINGS

In order to more clearly describe the technical solutions of the embodiments of the present application or of the prior art, drawings that need to be used in embodiments and the prior art will be briefly described below. Obviously, the drawings provided below are for only some embodiments of the present application; those skilled in the art can also obtain other drawings based on these drawings without any creative efforts.

Figure 1:
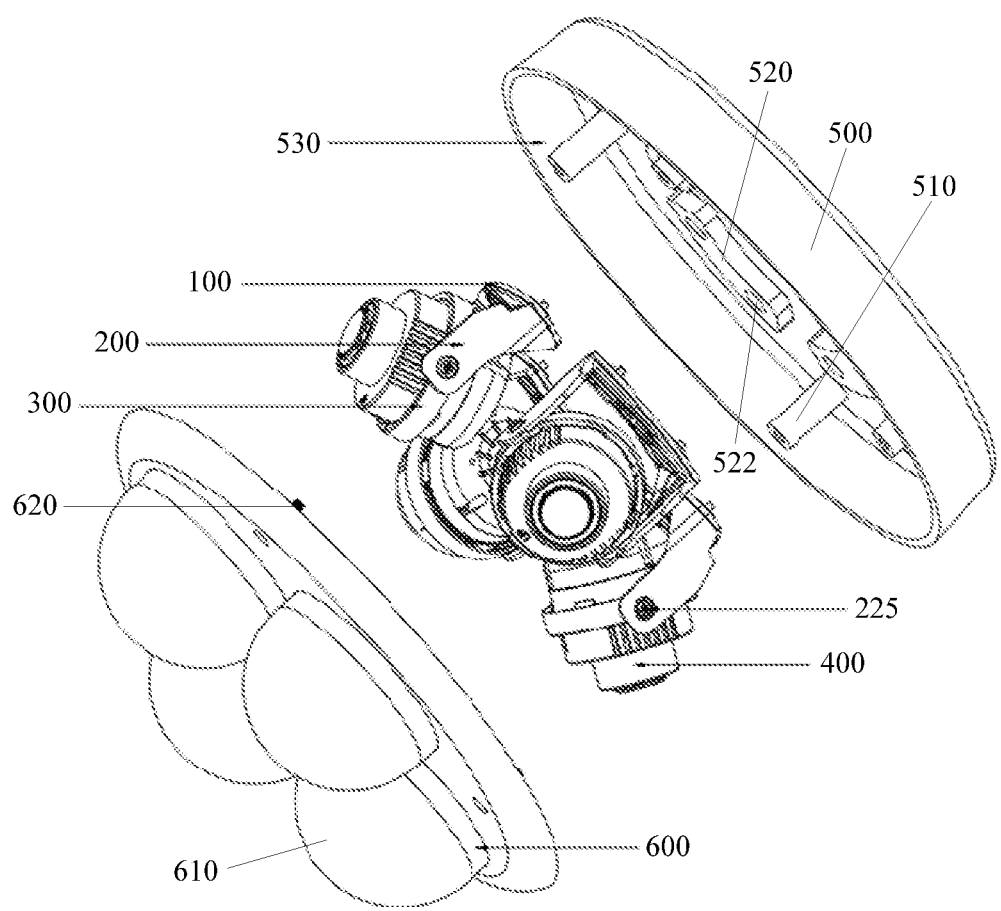
FIG. 1 is an exploded view of a multi-lens camera disclosed in an embodiment of the present application.

A LIST OF REFERENCE NUMERALS 100 first holder
110 support plane
120 first engaging tooth
130 first snap
140 first elastic arm
150 second screw 160 lightening hole
170 connection hole
180 receiving slot
190 positioning projection
200 second holder
210 first toothed slot
220 support arm
221 second tensioning projection
222 first restriction portion
223 support arm body
224 fixed block
225 first screw
230 connection plate
231 engagement hole
300 third holder
310 tensioning disk
311 tensioning slot
312 second restriction portion
320 annular member
321 second engaging tooth
322 second snap
323 protuberance
324 third restriction portion
400 lens
410 second toothed slot
420 fourth restriction portion
500 body
510 connection post
511 screw hole
520 mounting base
521 screw hole
522 positioning slot
530 receiving space
600 transparent cover
610 curved surface portion
630 third screw

DETAILED DESCRIPTION

The technical solutions in the embodiments of the present application will be described clearly and completely in conjunction with the drawings in the embodiments of the present application. Obviously, the described embodiments are only a part, not all, of the embodiments of the present application. Based on the embodiments in the present application, all other embodiments obtained by those skilled in the art without any creative work will fall within the scope of protection of this application.

The technical solutions provided by the embodiments of the present application will be described in detail below in conjunction with the drawings.

Referring to FIGS. 1-8, a lens adjusting device for a multi-lens camera disclosed in an embodiment of the present application includes a first holder 100 and a second holder 200. The first holder 100 is fixed on a body 500 of the multi-lens camera. Specifically, the first holder 100 may be fixed on the body 500 via a second screw 150. The second holder 200 is provided on the first holder 100 and is configured for mounting a lens 400. The lens 400 can rotates following the second holder 200.

The second holder 200 is rotatably cooperated with the first holder 100. The second holder 200 in an actuated state can rotate in a direction parallel to a support plane 110 of the first holder 100. In other words, the rotatable cooperation between the second holder 200 and the first holder 100 is a tight cooperation. A relative rotation between the first holder and the second holder can be implemented only under an actuation by an external force. A plurality of lenses 400 of the multi-lens camera are all arranged in a plane where the support plane 110 is located. The lens 400 rotates in the direction parallel to the support plane 110, which is called an adjustment of the lens 400 in P direction.

Specifically, one of the support plane 110 of the first holder 100 and a surface of the second holder 200 opposite to the support plane is provided with a first toothed slot, and the other is provided with a first engaging tooth. The first engaging tooth is elastically engaged with the first toothed slot in the rotation direction of the second holder 200. Specifically, the support plane 110 may be provided with a first engaging tooth 120, and the second holder 200 may be provided with a first toothed slot 210. Of course, the first engaging tooth 120 may be provided on the second holder 200, and accordingly, the first toothed slot 210 may be provided on the support plane 110 of the first holder 100.

Herein, the elastic engagement means that the engaging tooth and the toothed slot maintains in a fixed cooperation state without external force; the fixed cooperation of the engaging tooth and the toothed slot is released due to deformation under the external force, so as to cause them to rotate relative to each other; and when the external force disappears, the engaging tooth and the toothed slot restores to the fixed cooperation state.

In the embodiment of the present application, the first holder 100 and the second holder 200 are elastically engaged through the first engaging tooth 120 and the first toothed slot 210. In an adjustment process, an operator applies a certain force to actuate the first holder 100 to rotate. In the rotation process of the first holder 100, the first toothed slot 210 and the first engaging tooth 120 move relative to each other. After the adjustment ends (the external force disappears), the engagement between the first toothed slot 210 and the first engaging tooth 120 can ensure that the first holder 100 is positioned at an adjusted position, then finally the adjustment of lens 400 in P direction is completed.

It can be known from the adjustment process above, the first holder 100 and the second holder 200 are elastically engaged through the first engaging tooth 120 and the first toothed slot 210. In the adjustment of the lens 400 in P direction, the operator is required to rotate only the second holder 200, without performing unscrewing and screwing operations described in background. This makes operation of the adjustment of lens 400 in P direction easy, that is, the operator is required to perform an operation of just one step. Obviously, the above structure of the lens adjusting device can improve the adjustment efficiency of the lens 400.

Referring to FIG. 1 and FIG. 7 again, there may be a plurality of first holders 100. Each of the second holders 200 may be mounted on a corresponding first holder 100. In a specific implementation, each of the first holders 100 has one second holder 200 mounted thereon. Of course, there may be one first holder 100, and all of the second holders 200 may be mounted on the one first holder 100. To reduce the weight, a plurality of lightening holes 160 may be provided on the first holder 100.

In the embodiment, the second holders 200 may include two support arms 220 and a connection plate 230. The connection plate 230 is connected with the two support arms 220 configured for supporting the lens 400. In a specific implementation, the connection plate 230 and the two support arms 220 may be an integrated structure. The connection plate 230 may be provided with an engagement hole 231. The first holder 100 may be provided with a plurality of first snaps 130. The plurality of first snaps 130 pass through the engagement hole 231 and engage with the connection plate 230. The plurality of first snaps 130 can implement the connection between the first holder 100 and the second holder 200, and meanwhile can also provide a rotation basis for the rotation of the second holders 200. In this case, two support arms 220 rotate relative to the first holder 100 via the connection plate 230, so that two support arms 220 bring the lens 400 to rotate relative to the first holder 100. Of course, the rotatable connection between the first holder 100 and the second holder 200 in the tight connection may be implemented in other manners.

In a specific implementation, a surface of the connection plate 230, which is opposite to the first holder 100, is provided with a plurality of first toothed slots 210. The plurality of first toothed slots 210 are distributed along a circumference centered on an axis of the engagement hole 231.

In order to avoid an error operation of the second holder 200 under a small interference, in an optional scheme, at least one of a surface of the second holder 200 and a surface of the first holder 100 opposite to the surface of the second holder is provided with a tensioner portion that can abut against the other one of the surface of the second holder 200 and the surface of the first holder 100 opposite to one another with tension. Specifically, the tensioner portion may include a first tensioning projection and/or a first elastic arm 140. The tensioner portion takes a tensioning effect to enable the second holder 200 to be actuated by a larger force in the adjustment process. In this case, the second holder 200 will not randomly rotate under the small interference. To improve the cooperation effect, the first engaging tooth 120 is provided on the first elastic arm 140. The first engaging tooth 120 is stably engaged with the first toothed slot 210 by means of an elastic force applied by the first elastic arm 140.

In the lens adjusting device disclosed in the embodiment of the present application, a third holder 300 may be provided on the second holder 200. The third holder 300 is rotatably cooperated with the lens 400 and enables the lens 400 to rotate around its axis, to achieve the purpose of adjusting the lens 400, that is, to implement the adjustment of the lens 400 in R direction.

The third holder 300 may be rotatably provided on the second holder 200, and can rotate in a direction perpendicular to the support plane 110 of the first holder 100, so that the third holder 300 causes the lens 400 to perform pitching motion relative to the support plane 110, and finally a rotation adjustment of the lens 400 in the direction perpendicular to the support plane 110, that is, an adjustment in T direction is implemented.

As described above, the second holder 200 may include the support arm 220. To improve the flexibility of the adjustment, the third holder 300 may include a tensioning disk 310 that is movably cooperated with the support arm 220. The tensioning disk 310 includes a tensioning zone. One of the tensioning zone and the support arm 220 is provided with a second tensioning projection, and the other is provided with a plurality of tensioning slots 311 that extend radially along the tensioning disk 310. The tensioning slots 311 engage with the second tensioning projection.

In a specific implementation, the tensioning slots 311 are provided on the tensioning disk 310, and the second tensioning projection 221 is provided on the support arm 220. The second tensioning projection 221 and the tensioning slots 311 can move relative to each other with the rotation of the second holder 200. It should be noted that the engagement between the tensioning slots 311 and the second tensioning projection 221 is also an elastic engagement. The second tensioning projection 221 and the tensioning slots 311 are positioned to ensure that the lens 400 is maintained in a certain position, when the third holder 300 is not subjected to external force. When the third holder 300 is subjected to an external force, the engagement between the second tensioning projection 221 and the tensioning slots 311 is released due to the elastic deformation, so as to enable them to rotate relative to each other.

In an actual application, the lens 400 is only required to rotate relative to the second holder 200 within a set angle range. Based on this, referring to FIG. 4, the support arm 220 may be provided with a first restriction portion 222, and the tensioning disk 310 is provided with a second restriction portion 312. The second restriction portion 312 can be restrictedly cooperated with the first restriction portion 222 in the rotation direction of the tensioning disk 310.

Figure 4:
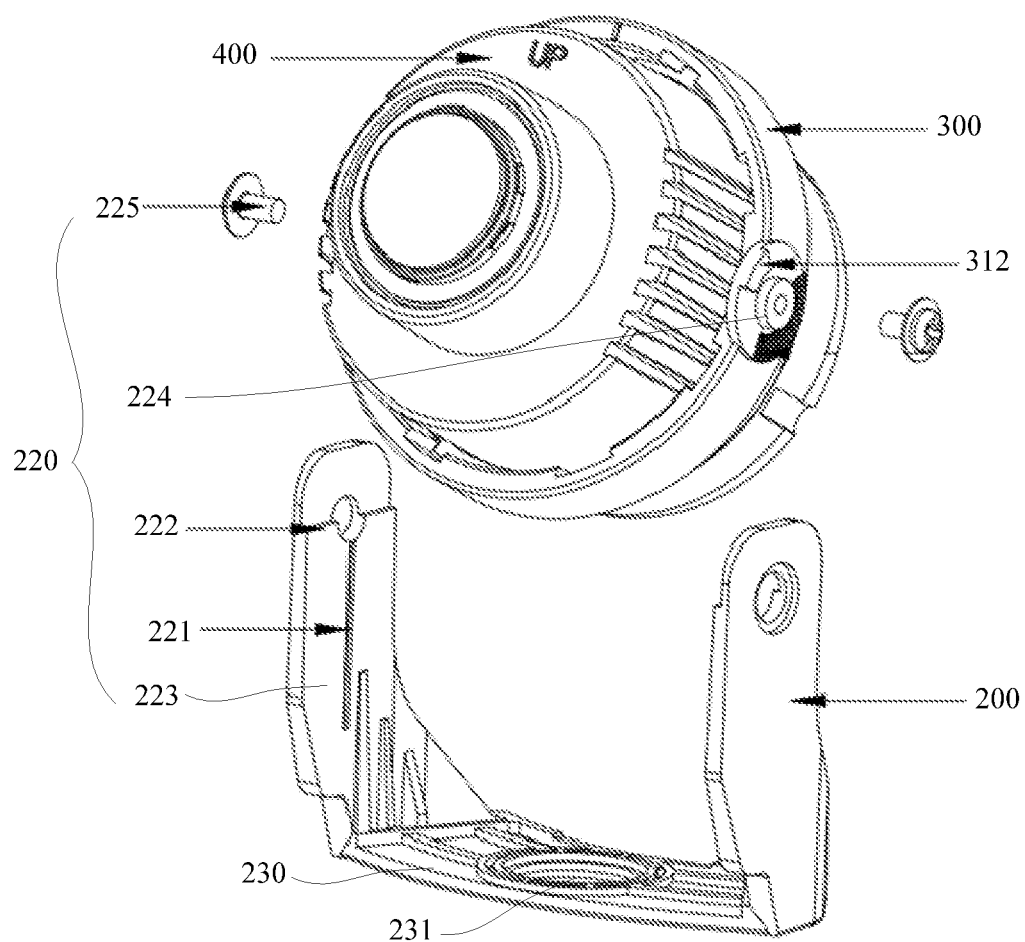
FIG. 4 is an exploded view of the second holder and a lens disclosed in the embodiment of the present application.
Figure 5:
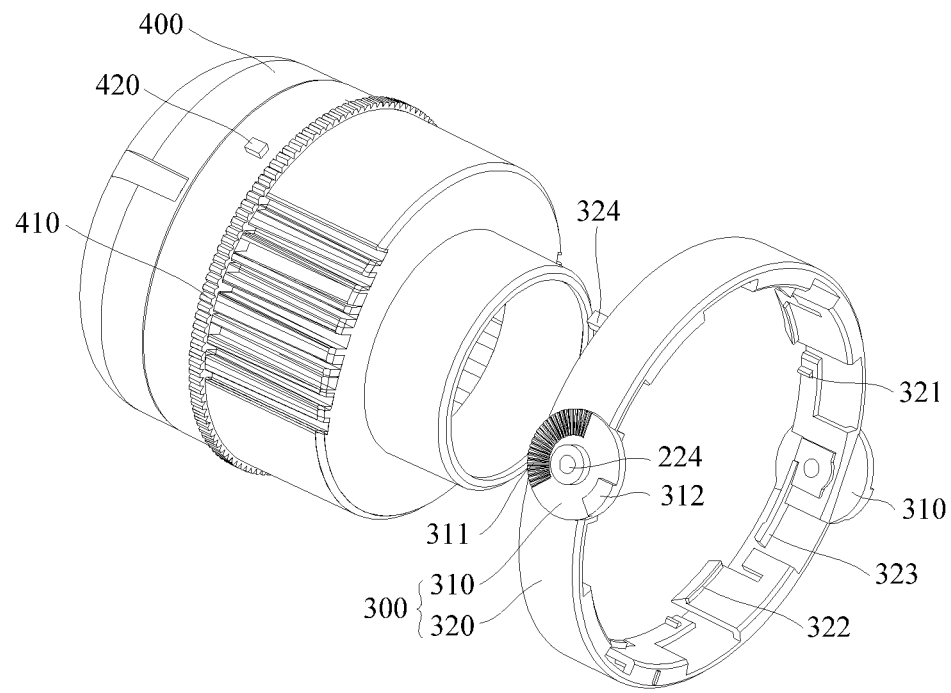
FIG. 5 is an exploded view of a third holder and a lens disclosed in the embodiment of the present application.
Figure 6:
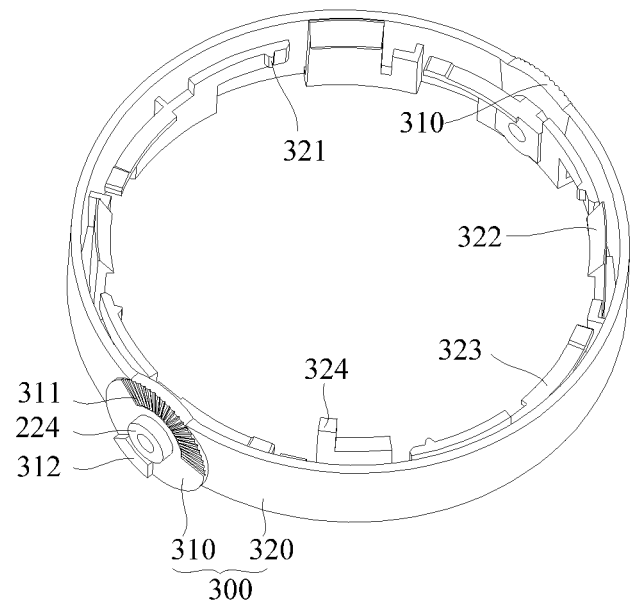
FIG. 6 is a structural view of the third holder disclosed in the embodiment of the present application.

Referring to FIG. 4, in a specific implementation, the support arm 220 may include a support arm body 223 and a fixed block 224 rotatably connected with the support arm body 223. The fixed block 224 is connected with the tensioning disk 310. The fixed block 224 is nested into a through-hole of the support arm body 223 and rotatably connected with the support arm body 223 via a first screw 225. The support arm 220 may include the support arm body 223 and the fixed block 224 rotatably connected with the support arm body 223. The fixed block 224 is connected with the tensioning disk 310, so as to enable them to rotate relative to each other. The fixed block 224 is nested into the through-hole of the support arm body 223 and rotatably connected with the support arm body 223 via the first screw 225. The scheme enables lens 400 to rotate relative to the support arm 220 through a rotatable cooperation between the fixed block 224 and the tensioning disk 310.

In order to improve the stability of the rotation of the lens 400, in an optional scheme, there may be two support arms 220. The two support arms 220 are respectively arranged at two sides of the third holder 300.

Referring to FIGS. 1, 5 and 6 again, the third holder 300 may include an annular member 320. The annular member 320 is movably cooperated with the lens 400, so as to enable the lens 400 to rotate around its axis. The tensioning disk 310 may be provided on the annular member 320.

One of the annular member 320 and the lens 400 is provided with a second toothed slot and the other is provided with a second engaging tooth that engages with the second toothed slot. The second engaging tooth rotates relative to the second toothed slot in the circumferential direction of the lens 400. Specifically, the second toothed slot 410 may be provided on the lens 400, and accordingly, the second engaging tooth 321 may be provided on the annular member 320.

An inner wall of the annular member 320 may be provided with a second snap 322 and a protuberance 323. The protuberance 323 is rotatably cooperated with one end of the second toothed slot 410 on the lens 400 or the second engaging tooth 321 in a set direction, so that a contact between the annular member 320 and the lens 400 changes from a surface-to-surface contact to a point-to-point contact. The second snap 322 is connected with the other end of the second toothed slot 410 on the lens 400 or the second engaging tooth 321, so as to enable the positioning of the lens 400 and the annular member 320 in the axial direction of the annular member 320. It should be noted that the set direction is the axis direction of the lens 400.

Specifically, the protuberance 323 may be a third elastic arm perpendicular to the inner wall of the third holder 300.

The third elastic arm is tensionably cooperated with one end of the second toothed slot 410 or the second engaging tooth 321.

In an actual application, the lens 400 usually rotates around its axis in a certain angle range, without rotating around its axis in the angle range of 360°. Based on this, referring to FIGS. 5-6 again, in an optional scheme, the annular member 320 may be provided with a third restriction portion 324, and the lens 400 may be provided with a fourth restriction portion 420. The third restriction portion 324 and the fourth restriction portion 420 are restrictedly cooperated in the direction in which the lens 400 rotates around its axis. The restriction cooperation between the third restriction portion 324 and the fourth restriction portion 420 can enable the lens 400 to rotate within a required angle range.

Based on the lens adjusting device disclosed in the embodiment of the present application, the embodiment of the present application discloses a multi-lens camera. The disclosed multi-lens camera includes the lens 400 and the lens adjusting device according to the aforementioned embodiment. The lens 400 is mounted on the lens adjusting device.

The multi-lens camera disclosed in the embodiment of the present application further includes a body 500 and a transparent cover 600. The lens adjusting device is mounted in an inner cavity formed by the transparent cover 600 and the body 500. The lens adjusting device is fixedly connected with the body 500. The transparent cover takes a good protection effect. Specifically, the transparent cover 600 may include curved surface portions 610. Each of the curved surface portions 610 covers one of the lenses 400. The curved surface portions 610 can improve the anti-deformation capability of the whole transparent cover, and thus improve the explosion-proof performance of the multi-lens camera.

Figure 7:
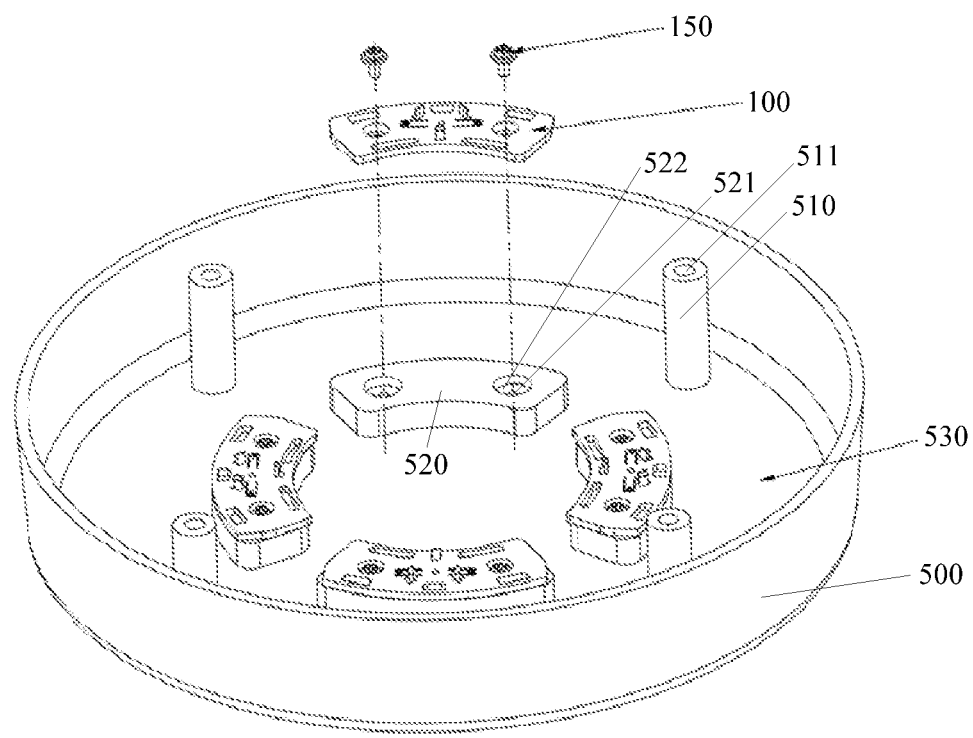
FIG. 7 is a view of a connection between a body and the first holder.
Figure 8:
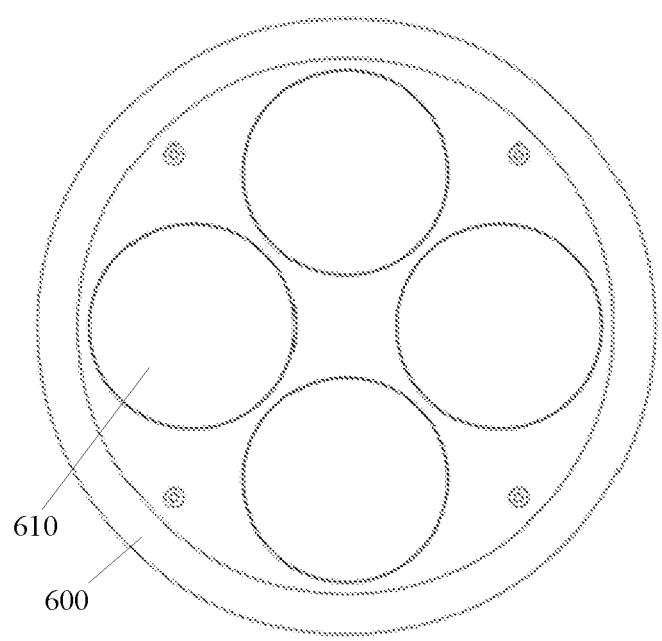
FIG. 8 is a structural view of a transparent cover disclosed in the embodiment of the present application.

In the embodiment of the application, the transparent cover 600 may be fixedly connected with the body 500 via a third screw 620. Specifically, a connection post 510 may be provided in the body 500. A screw hole 511 is provided on the connection post 510. The third screw 620 passes through the transparent cover 600 and then is fixedly connected with the screw hole, so as to enable a fixed connection between the transparent cover 600 and the body 500. As shown in FIG. 7, the body 500 may include a receiving space 530. The connection post 510 is received in the receiving space 530. To implement a good cooperation, one end of the connection post 510 at which the screw hole is provided may be aligned with a top opening of the receiving space 530.

A mounting base 520 may be provided on a bottom wall of the receiving space 530. The first holder 100 is mounted in the mounting base 520 in one-to-one correspondence. Specifically, there may be a plurality of mounting bases 520. The plurality of mounting bases 520 are fixedly connected to form an annular base. Such a structure may facilitate the mounting of the plurality of mounting bases 520, but it will increase the weight of the body 500. In view of this, in an optional solution, the plurality of mounting bases 520 are arranged separately. Each mounting base 520 is arranged in correspondence to one first holder 100. This will undoubtedly ensure that the first holder 100 can be mounted with less material consumption.

Figure 2:
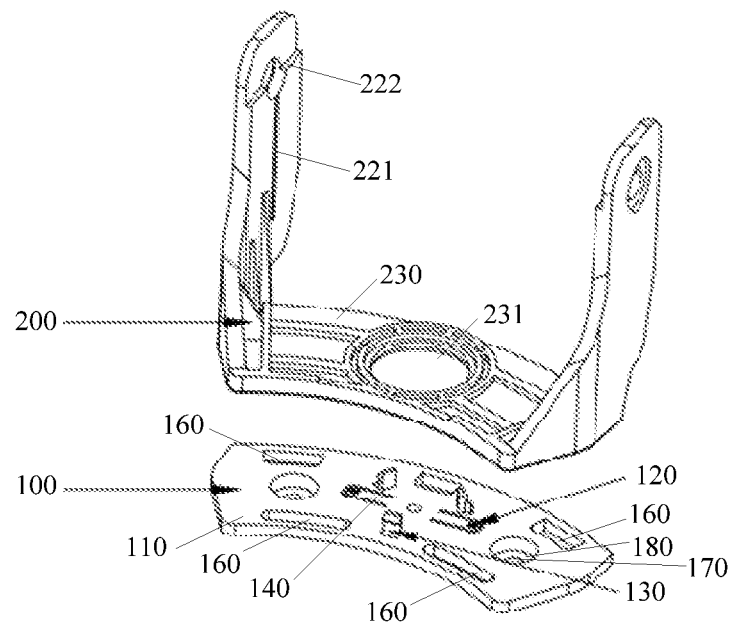
FIG. 2 and FIG. 3 respectively are exploded views in different views of a first holder and a second holder disclosed in the embodiment of the present application.

The first holder 100 is provided with a connection hole 170, and the mounting base 520 is provided with a screw hole 521. The connection hole 170 may be fixedly connected to the screw hole 521 via a second screw 150. To improve the compactness of the assembly, in an optional scheme, the end of the connection hole 170 facing away from the screw hole 521 may include a receiving slot 180. As shown in FIG. 2, the receiving slot 180 receives a nut-like portion of the second screw 150. Such an arrangement can place the nut-like portion well, and thus can avoid the impacts of the nut-like portion to the rotation.

Figure 3:
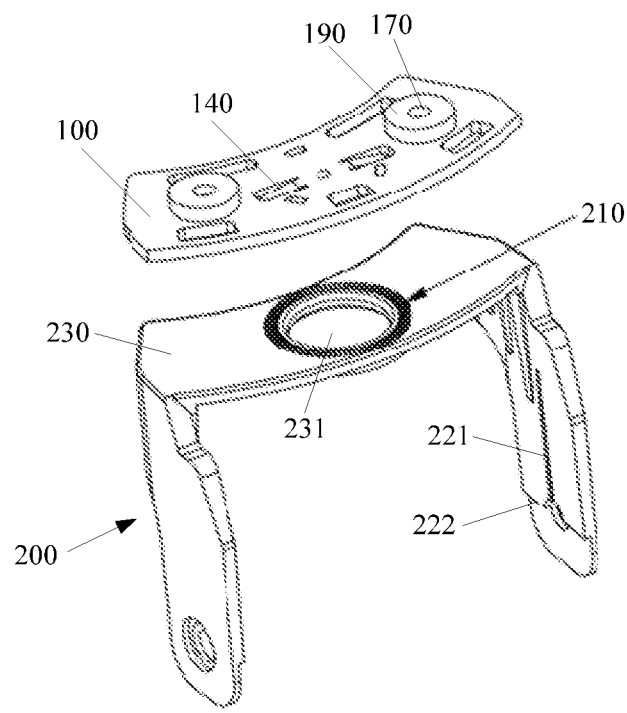

For ease of assembly, one of the first holder 100 and the mounting base 520 may be provided with a positioning projection 190, and the other may be provided with a positioning slot 522. The positioning projection 190 is fixedly cooperated with the positioning slot 522. In a specific implementation, as shown in FIG. 3 and FIG. 7, the positioning projection 190 is provided on the first holder 100, and the positioning slot 522 is provided on the mount base 520. There may be one or more positioning projections 190 and positioning slots 522. In case there are multiple positioning projections and positioning slots, it can implement the positioning better. In a specific implementation, the number of the positioning projections 190 may be two, and the number of the positioning slots 522 may be two.

In an optional embodiment, the connection hole 170 can pass through the first holder 100 and pass through the positioning projection 190. A screw hole 521 may be provided at the bottom of the positioning slot 522. Such a structure can facilitate the positioning and connection operations between the first holder 100 and the mounting base 520.

Herein, as long as there is no contradiction, the technical features in each optional solution can be combined to form a solution, and these solutions are within the scope of the disclosure of the present application.

Herein, each alternative only focuses on the difference with other alternatives. As long as there is no conflict, each alternative can be combined arbitrarily. The combined embodiments are also within the scope of this specification. In view of the simplicity of the text, this article will not describe the embodiments formed by the combination separately.

The embodiments described above are simply preferable embodiments of the present application, and are not intended to limit the scope of protection of the present application. Any modifications, alternatives, improvements, or the like within the spirit and principle of the present application shall be included within the scope of protection of the present application.

What is claimed is:

1. A lens adjusting device for a multi-lens camera, comprising:
    a first holder (100); and
    a second holder (200), which is provided on the first holder (100) and is configured for mounting a lens (400);
    wherein, the second holder (200) is rotatably cooperated with the first holder (100);
    the second holder (200) in an actuated state can rotate in a direction parallel to a support plane (110) of the first holder (100);
    one of the support plane (110) of the first holder (100) and a surface of the second holder (200) opposite to the support plane is provided with a plurality of first toothed slots (210), and the other is provided with first engaging teeth (120); and
    the first engaging teeth (120) is elastically engaged with the first toothed slots (210) in the rotation direction of the second holder (200),
    wherein, at least one of a surface of the second holder and a surface of the first holder opposite to the surface of the second holder is provided with a first elastic arm (140), the first engaging teeth (120) are provided on the first elastic arm (140), and is stably engaged with the first toothed slots by means of an elastic force applied by the first elastic arm (140).

2. The lens adjusting device according to claim 1, wherein,
the first holder (100) comprises a plurality of first holders (100) which are separately arranged; and
each of the plurality of first holders has a second holder (200) mounted thereon.

3. The lens adjusting device according to claim 1, wherein,
the second holder (200) comprises two support arms (220) and a connection plate (230) connected with the two support arms (220);
the connection plate (230) is provided with an engagement hole (231);
the first holder (100) is provided with a plurality of first snaps (130); and
the plurality of first snaps (130) pass through the engagement hole (231) and engage with the connection plate (230).

4. The lens adjusting device according to claim 3, wherein,
a surface of the connection plate (230), which is opposite to the first holder (100), is provided with the plurality of first toothed slots (210); and
the plurality of first toothed slots (210) are distributed along a circumference centered on an axis of the engagement hole (231).

5. The lens adjusting device according to claim 1, wherein,
at least one of a surface of the second holder (200) and a surface of the first holder (100) opposite to one another is provided with a tensioner portion that can abut against the other one of the surface of the second holder (200) and the surface of the first holder (100) opposite to one another with tension.

6. The lens adjusting device according to claim 5, wherein,
the tensioner portion comprises a first tensioning projection and/or a first elastic arm (140).

7. The lens adjusting device according to claim 1, wherein,
a third holder (300) is provided on the second holder (200); and
the third holder (300) is rotatably cooperated with the lens (400) and enables the lens (400) to rotate around its axis.

8. The lens adjusting device according to claim 7, wherein,
the third holder (300) is rotatably provided on the second holder (200) and can rotate in a direction perpendicular to the support plane (110).

9. The lens adjusting device according to claim 8, wherein,
the second holder (200) comprises a support arm (220) rotatably cooperated with the third holder (300);
the third holder (300) comprises a tensioning disk (310) rotatably connected with the support arm (220);
the tensioning disk (310) comprises a tensioning zone, one of the tensioning zone and the support arm (220) is provided with a second tensioning projection (221), and the other is provided with a plurality of tensioning slots (311) that extend radially along the tensioning disk (310); and the tensioning slots (311) elastically engage with the second tensioning projection (221).

10. The lens adjusting device according to claim 9, wherein,
the support arm (220) comprises two support arms (220); and
the two support arms (220) are respectively arranged on two sides of the third holder (300).

11. The lens adjusting device according to claim 7, wherein,
the third holder (300) comprises an annular member (320), which is sleeved on the lens (400); and
the annular member (320) is rotatably cooperated with the lens (400).

12. The lens adjusting device according to claim 11, wherein,
one of the annular member (320) and the lens (400) is provided with a second toothed slot (410) and the other is provided with a second engaging tooth (321) that elastically engages with the second toothed slot (410); and
the second engaging tooth (321) rotates relative to the second toothed slot (410) in the circumferential direction of the lens (400).

13. The lens adjusting device according to claim 1, wherein, the first holder (100) is provided with a plurality of lightening holes (160).

14. A multi-lens camera, comprising:
lenses; and
a lens adjusting device;
wherein, the lenses (400) are mounted on the lens adjusting device; and
the lens adjusting device is the lens adjusting device according to claim 1.

15. The multi-lens camera according to claim 14, further comprising a body (500), wherein,
the body (500) comprises a receiving space (530);
a mounting base (520) is provided on a bottom wall of the receiving space; and
the first holder (100) is mounted on the mounting base (520) in one-to-one correspondence.

16. The multi-lens camera according to claim 15, wherein,
the first holder (100) is provided with a connection hole (170);
the mounting base (520) is provided with a screw hole (521); and
the connection hole (170) is fixedly connected to the screw hole (521) via a second screw (150).

17. The multi-lens camera according to claim 16, wherein,
the end of the connection hole (170) facing away from the screw hole (521) comprises a receiving slot (180); and
the receiving slot (180) receives a nut-like portion of the second screw (150).

18. The multi-lens camera according to claim 15, wherein,
one of the first holder (100) and the mounting base (520) is provided with a positioning projection (190), and the other is provided with a positioning slot (522); and
the positioning projection (190) is fixedly cooperated with the positioning slot (522).

19. The multi-lens camera according to claim 15, wherein,
the mounting base (520) comprises a plurality of mounting bases; and
the plurality of mounting bases (520) are separately arranged, or connected with one another to form an annular base with an integrated structure.

20. The multi-lens camera according to claim 14, further comprising a transparent cover (600), wherein, the lens adjusting device is mounted in an inner cavity formed by the transparent cover (600) and the body (500);

the transparent cover (600) comprises curved surface portions (610); and each of the curved surface portion (610) covers one of the lens (400).

\* \* \* \* \*